United States Patent [19]

Sullivan

[11] Patent Number: 5,456,954
[45] Date of Patent: Oct. 10, 1995

[54] UV-TREATED GOLF BALL

[75] Inventor: Michael J. Sullivan, Chicopee, Mass.

[73] Assignee: Lisco, Inc., Tampa, Fla.

[21] Appl. No.: 195,561

[22] Filed: Feb. 14, 1994

Related U.S. Application Data

[63] Continuation of Ser. No. 933,533, Aug. 24, 1992, abandoned.

[51] Int. Cl.⁶ ........................................................ B05D 3/06
[52] U.S. Cl. .................. 427/553; 273/235 A; 273/235 B
[58] Field of Search ................................ 427/553; 273/62, 273/235 R, 235 A, 235 B

[56] References Cited

U.S. PATENT DOCUMENTS

| | | | |
|---|---|---|---|
| 4,303,697 | 12/1981 | Baseden | 427/553 |
| 4,911,451 | 3/1990 | Sullivan et al. | 273/235 R |
| 5,200,122 | 4/1993 | Katoh et al. | 264/22 |
| 5,266,362 | 11/1993 | Katoh et al. | 427/553 |

FOREIGN PATENT DOCUMENTS

| | | | |
|---|---|---|---|
| 471079 | 2/1992 | European Pat. Off. | |
| 57-159824 | 10/1982 | Japan | 427/553 |
| 58-098340 | 6/1983 | Japan | 427/553 |
| 59-147027 | 8/1984 | Japan | 427/553 |
| 4061870 | 2/1992 | Japan | |
| 9111484 | 8/1991 | WIPO | 427/553 |

*Primary Examiner*—Shrive Beck
*Assistant Examiner*—Erma Cameron

[57] ABSTRACT

A method for improving the adhesive bonding of a top coat to a golf ball by subjecting an unfinished golf ball to ultraviolet light prior to application of a finish coat is disclosed. The golf balls so treated exhibit superior adhesion and avoid the need for application of a primer coat between the unfinished golf ball and the outer top coat.

11 Claims, No Drawings

UV-TREATED GOLF BALL

This is a continuation of application Ser. No. 07/933,533 filed on Aug. 24, 1992, now abandoned.

BACKGROUND OF THE INVENTION

A high-quality generally clear coating having good resistance to lifting, cracking, and abrasion is important to the production of commercially acceptable golf balls. At the same time, heightened environmental awareness has induced governments to enact laws which place tough new restrictions on emissions of volatile organic chemicals which may be present in primer coats. Although many primer coats are waterborne systems today, primers which contain epoxy resins dissolved in organic solvents may still be used to improve adhesion of a top (finish) coat to a golf ball.

The outer surface of a golf ball must accept a coating which will not chip, peel or flake when subjected to very strong impact force and friction force of golfing. Unfortunately, the adhesion of such coatings to specific plastics used in the production of golf balls is weak. Attempts have been made to improve adhesion of such coatings to the surface of the golf ball. Some approaches to improving adhesion have included roughening the surface of the ball by subjecting to a flame or sandblasting. Both methods, however, cause damage to the precisely designed and formed dimples of the most recently developed golf balls. The damages have an adverse effect on ball flight. Alternatively, golf balls have been pre-coated with a treatment solution containing ethyleneimine, carbodiimide or a derivative thereof. U.K. Appln. 2,227,671 suggests applying an outer covering layer to a golf ball by molding a cover member around a core member in which prior to molding the cover material is provided with the outer layer, i.e. a biaxially-oriented film or a co-extruded film laminate. This outer covering layer is intended to improve the adhesion of a paint or varnish to the ball and/or improve the reception of an identification mark or stamp.

However, each of the above methods still necessitates the application of a primer coat between the molded ball and the top coating. The use of a primer, while currently conventional, has several disadvantages in that it generally entails the use of hazardous chemicals, high temperatures, releases volatile organic compounds, and is relatively high in cost. As a result, other methods of improving adhesion are under exploration. One attempt at improving adhesion of a paint or lacquer to a golf ball while avoiding the use of a primer coat entails treating a formed un-coated golf ball with an unpolymerizable gas plasma before applying a finish paint coat. U.S. Pat. No. 4,613,403 discloses subjecting golf balls to an inert gas which is energized by applying a voltage and reducing the pressure to the range of 10.00–0.01 Torr. This is performed by placing the golf balls in an apparatus with a sealed casing to create a vacuum for plasma treatment. Since undesirable strong ashing can occur when oxygen is present during treatment, it must be excluded from the casing. The treatment conditions of temperature, gas content, and pressure must be carefully controlled and contained. Accordingly, there is need for a simpler technique to improve adhesion while avoiding the use of primers.

It is known that the adhesion of certain plastic materials to various other materials may be improved when the plastic material has been irradiated. This has been done with, for example, automobile bumpers and side molding, car mats, adhesive tape, and plastic bottles, but these are not products which are expected to suffer the extreme abrasive forces to which a golf ball is constantly exposed. Moreover, these products are not required to absorb the abrasive forces while having a continuing requirement of no peeling of the top coating.

The applicants have determined that certain exposures of golf balls to UV light can improve adhesion of the plastic surface to a level sufficient to eliminate the need for applying a primer before the application of a top coat. The use of the term "top coat" includes paints, varnishes, polyurethanes, solvent-based urethanes, or any other conventional outer finishes used in the manufacture of golf balls. The method can be practiced without requiring highly specialized equipment to regulate temperature, pressure, and gas concentration. Most importantly, the method results in enhanced adhesion while maintaining a commercially acceptable level of appearance and durability of the golf ball.

Accordingly, it is an object of the invention in the production of golf balls to eliminate any need for a primer before application of the top coat while avoiding the detriments of gas plasma treatments.

It is another object of the invention to improve the adhesion of a top coat to a golf ball with minimal use and release into the atmosphere of hazardous chemicals.

It is another object of the invention to improve the adhesion of a top coat to a golf ball without damaging the surface of the golf ball.

It is still another object of the invention to treat golf balls at ambient temperatures and pressure.

SUMMARY OF THE INVENTION

Accordingly, the present invention is directed to a method of improving adhesion of the molded surface of a golf ball to a top coating by exposing the unfinished surface of the golf ball to ultraviolet light before the application of the top coat. The term "unfinished surface" refers to the outermost layer of a golf ball after the molding process is complete. The preferred surfaces are polyolefin-rich. Examples of polyolefin-rich surfaces are copolymers of ethylene and methacrylic acid or copolymers of ethylene and acrylic acid. The acids are commonly partially neutralized and used as the metal salts thereof. As a result of exposure to ultraviolet light at ambient temperatures, the modified golf ball surface bonds more easily to a top coat without application of a primer, exposure to high temperature, or damage to the surface.

DETAILED DESCRIPTION OF THE INVENTION

More particularly, golf balls treated according to the method of the present invention are produced by any techniques known in the art, usually injection molding. Upon completion of the molding process, the outer surface of the unfinished golf ball will preferably be polyolefin-rich, such as that resulting from a partially neutralized copolymer of ethylene and methacrylic acid (trademark SURLYN) or a partially neutralized copolymer of ethylene and acrylic acid (trademarks ESCOR and IOTEK). Other possible golf ball surfaces useful herein comprise polyamide, PVC, polyethylene, polyurethane, and epoxy- or acrylate-based outer surfaces. The term "unfinished golf ball" is used herein to refer to a golf ball after having been formed but before any finish coats such as conventional primers or top coats are applied. The unfinished golf balls may be white or colored.

The unfinished golf balls are then exposed to ultraviolet energy, preferably ultraviolet light with primary and secondary peaks of approximately 254 and 184 nanometers, respectively, for periods of time ranging from about 60 seconds to about 540 seconds. After this exposure, a conventional top coat is applied without first applying a primer. A "primer" in the golf ball industry generally means a clear epoxy coating which improves the adhesion of a subsequent urethane top coat to the golf ball. The practice of the present invention enables the direct use of conventional top coats while avoiding the use of any primer coat.

The effect of the exposure of the golf ball to UV light, preferably at wavelengths of about 254 and 184 nanometers, is believed to be a chemical change of the preferably polyolefin-rich surface of the unfinished golf ball which increases the bonding energy of the surface and allows for better wetting and enhanced adhesion. Although not bound by any theory, it is believed that the golf ball surface is oxidized by exposure to the ultraviolet energy and that the oxidation increases the surface energy and polarity thereby introducing functional groups in and on the surface which groups are capable of interacting with conventional golf ball top coats. The resulting enhanced adhesion eliminates the need for a primer. Accordingly, when solvent-based primers would be used, the elimination of the primer can avoid volatile organic chemical emissions associated therewith. As shown below the test results show a clear improvement in coating adhesion after use of this invention as compared to untreated, unprimed golf balls.

Suitable top coats for use herein are those conventionally used in the golf ball industry. Generally such coatings are polyurethanes, more commonly polyester polyurethanes. Suitable polyesters typically are saturated and have a high degree of branching, although linear polymers are also useful, particularly as modifiers. The polyesters are crosslinked with materials such as aliphatic or aromatic polyfunctional isocyanates. While aqueous systems may be used, the coating components are more commonly dissolved in organic solvents such as ketones or alcohols. Particularly useful solvents include methyl ethyl ketone, methyl amyl ketone, and the like. The coatings may further contain additives such as optical brighteners, ultraviolet light stabilizers, and the like, all as well known in the art.

The following example illustrates the advantages of the present invention. The example is provided for the purpose of illustration and is not meant to be limiting.

EXAMPLE 108 golf balls were made by a conventional injection molding process well known to those skilled in the art. The unfinished golf balls where produced having an outer layer of a mixture of partially neutralized copolymers of ethylene and acrylic acid (trademark ESCOR or IOTEK). The balls had conventional dimples.

Six groups of 18 golf balls each were subjected to ultraviolet light for different periods of time ranging in increments of 60, 120, 240, 300, 480 and 540 seconds. The exposures were carried out by placing the balls on a work table in a high output, low pressure mercury lamp SEN Photo-Surface Processor Model No. PL12-200. which emits UV light simultaneously predominantly at two specific wavelengths, 184.9 nanometers and 253.7 nanometers. The work-table was rotated, i.e. turned over, mid-way through each exposure to assure complete exposure of the unfinished golf ball surface to the UV energy. It is contemplated that other conventional work tables, such as a stationary work table or conveyor belt, would work equally well. The balls treated with UV light were then coated with a conventional clear polyurethane golf ball top coat. The top coat was a solvent (methyl amyl ketone) borne two part saturated polyester polyurethane.

The above-prepared golf balls were then tested for finish durability and compared to control unfinished golf balls made by the same process. One group of controls was neither primed nor treated with UV light prior to application of the top coat. The second set of controls was primed but not treated with UV light before application of a top coat. The 108 treated balls and the controls were then subjected to a "wet barrel test durability test" for coating adhesion. In particular, three groups of balls were tested and compared: (1) untreated, unprimed balls, (2) untreated, primed balls and (3) UV-treated, unprimed (6 groups of 18 balls each). "Untreated" means the balls were not exposed to UV light as taught by the instant invention. The results are shown in the Table I below in which the time of the UV treatment is indicated in seconds of exposure:

TABLE I

| UNTREATED UNPRIMED | UNTREATED PRIMED | TREATED BY UV UNPRIMED | | | | | |
|---|---|---|---|---|---|---|---|
| | | 60 | 120 | 240 | 300 | 480 | 540 |
| PC-4 | PC-0 | PC-2 | PC-0 | PC-0 | PC-0 | PC-3 | PC-3 |

The Wet Barrel Durability Test grading system was:

| Grade | Definition |
|---|---|
| PC-0 | No lifting or cracking in dimples or on lands |
| PC-1 | Lifting or cracking in at most 1 dimple |
| PC-2 | Lifting or cracking in 1 to 3 dimples |
| PC-3 | Lifting or cracking in excess of 3 dimples and or lands |
| PC-4 | Complete lifting of both lands and dimples in sheets of ¼" or more |

The Wet Barrel Durability Test was performed by first soaking (immersing) the test golf balls in water for at least 3 hours. Thereafter each ball is fired 100 times at a velocity of 135 ft/sec at 72° F. into a five-sided container, the walls of which are steel plates that have had grooves milled therein to simulate the grooves present on a golf club face. The balls are then evaluated for durability.

Golf balls rated PC-0 and PC-1 are acceptable for top grade. Balls rated PC-2 and PC-3 are acceptable for downgrades only. Balls rated PC-4 are rejected for all current commercial products.

Golf balls which were not treated with UV light and which had no primer applied (UNTREATED, UNPRIMED in Table I) had a grading of PC-4 which is complete lifting of both lands and dimples in sheets of ¼" or more. This grading makes the product commercially unacceptable for even the lowest grade of golf ball.

Golf balls which were not treated with UV light but did have a coat of primer (UNTREATED, PRIMED in Table I), had a grading of PC-0 which means no lifting or cracking in dimples or on lands. This is the premium grade and is acceptable for top grade golf balls.

Golf balls treated with UV light as described herein with no primer (TREATED BY UV, UNPRIMED in Table I) had varying grades depending upon the exposure time. It is apparent that unlimited UV light exposure is undesirable. Those golf balls having and exposure time greater than about 60 seconds but less than about 480 seconds were rated PC-0 which means no lifting or cracking was observed in dimples or on lands. The Wet Barrel Durability results obtained are at least as good the previously best known technology which involved application of a primer. Golf balls treated as described in the present invention but exposed for a period of less than about 120 seconds or more than about 540 seconds received a grading of PC-2 and PC-3 respectively. Both of these results are adequate for use as "downgrade" golf balls and are better than golf balls which have been neither treated with UV light nor primed. As such, the optimum exposure time should be greater than about 60 but less than 480 seconds.

What is claimed is:

1. A method of making a finished golf ball from an unfinished golf ball without use of a primer coating, said method consisting essentially of the following steps: (i) providing an unfinished golf ball with an outer surface having an array of dimples and surrounding land areas disposed thereon, said outer surface consisting essentially of a partially neutralized copolymer of ethylene and methacrylic acid or a partially neutralized copolymer of ethylene and acrylic acid, (ii) subjecting the outer surface of the unfinished golf ball to ultraviolet energy for a period of time and then (iii) placing a top coat on the unfinished golf ball, whereby the top coat, when subjected to abrasion, exhibits resistance to lifting and cracking at both the dimples and land areas at a level less then PC-3 as determined by the Wet Barrel Durability Test procedure.

2. The method of claim 1 wherein the ultraviolet energy is emitted at wavelengths of about 184.9 and 253.7 nanometers.

3. The method of claim 2 wherein the wavelengths of ultraviolet energy at 184.9 and 253.7 nanometers are simultaneously emitted.

4. The method of claim 1 wherein step (ii) involves subjecting the unfinished golf ball to ultraviolet energy for about 60 to 540 seconds.

5. The method of claim 1 wherein step (ii) involves subjecting the unfinished golf ball to ultraviolet energy for greater than about 60 but less than about 480 seconds.

6. The method of claim 1 wherein step (ii) involves subjecting the unfinished golf ball to ultraviolet energy for about 120 seconds to about 300 seconds.

7. A method according to claim 1, wherein the period of ultraviolet energy exposure in step (ii) is sufficient to provide that the top coat placed on the golf ball in step (iii) has a degree of adhesion to the unfinished golf ball which is substantially as strong as the degree of adhesion of a substantially identical top coat applied over an epoxy primer coat of an unfinished golf ball which is not subjected to ultraviolet energy.

8. The method of claim 7 wherein the ultraviolet energy is emitted at least at wavelengths of about 184.9 and 253.7 nanometers.

9. The method of claim 7 wherein the exposure is for about 60 to 540 seconds.

10. A method according to claim 1, wherein the top coat applied in step (iii) comprises polyurethane.

11. A method of making a finished golf ball from an unfinished golf ball without use of a primer coating, said method consisting essentially of the following steps: (i) subjecting the unfinished golf ball having an outer surface comprising a partially neutralized copolymer of ethylene and methacrylic acid or a partially neutralized copolymer of ethylene and acrylic acid to sufficient ultraviolet energy to result in a finished golf ball which does not crack when subjected to a wet barrel durability test in which the finished golf ball is soaked in water for at least three hours and subsequently fired 100 times at a velocity of 135 ft/sec at 72° F. into a five sided container having walls formed from steel plates having grooves therein to simulate the grooves present in a golf club face and then (ii) placing a finish coating comprised of polyurethane on the golf ball.

* * * * *